United States Patent [19]

Neilson et al.

[11] Patent Number: 5,762,437
[45] Date of Patent: Jun. 9, 1998

[54] ROTARY DRUM SCANNER

[75] Inventors: Peter John Neilson; Paul Christopher Cook, both of Gloucestershire, England

[73] Assignee: Itek Colour Graphics Limited, Cheltenhan, United Kingdom

[21] Appl. No.: 286,209

[22] Filed: Aug. 5, 1994

[30] Foreign Application Priority Data

Aug. 6, 1993 [GB] United Kingdom ............... 9316355

[51] Int. Cl.$^6$ ............... F16B 5/10; G03B 27/60
[52] U.S. Cl. ............... 403/24; 403/348; 403/12; 358/490
[58] Field of Search ............... 403/349, 348, 403/350, 321, 322, 324, 325, 24, 1, 12; 358/490, 489, 491, 492, 493; 355/104, 47

[56] References Cited

U.S. PATENT DOCUMENTS

| | | | |
|---|---|---|---|
| 2,049,917 | 8/1936 | Mallina | 358/489 X |
| 2,339,133 | 1/1944 | Artzt | 358/489 |
| 2,695,925 | 11/1954 | Pollard | 358/490 |
| 3,578,909 | 5/1971 | Von Hippel et al. | 358/489 |
| 4,298,278 | 11/1981 | Katakura et al. | 355/104 X |
| 4,507,006 | 3/1985 | Golob et al. | 403/24 |
| 4,615,191 | 10/1986 | Grandy | 403/345 X |
| 4,637,710 | 1/1987 | Fujii et al. | 355/104 X |
| 4,796,061 | 1/1989 | Ikeda et al. | 355/47 X |
| 4,916,367 | 4/1990 | Yamaguchi et al. | 355/47 X |
| 5,080,519 | 1/1992 | Chi | 403/324 X |
| 5,218,405 | 6/1993 | Wong | 355/200 |
| 5,317,424 | 5/1994 | Aotani | 358/490 X |
| 5,347,673 | 9/1994 | Nickels, Jr. | 403/348 X |
| 5,515,182 | 5/1996 | Lehman et al. | 358/493 |
| 5,526,142 | 6/1996 | Ouellette | 358/491 |

FOREIGN PATENT DOCUMENTS 163692  9/1980  Netherlands ............... 358/492

*Primary Examiner*—Harry C. Kim
*Attorney, Agent, or Firm*—Donald C. Casey, Esq

[57] ABSTRACT

A rotary drum scanner comprises a rotatably mounted hub, a drum detachably mounted to the hub and an interlock mechanism which locks the hub against rotation until the drum is locked to the hub.

11 Claims, 3 Drawing Sheets

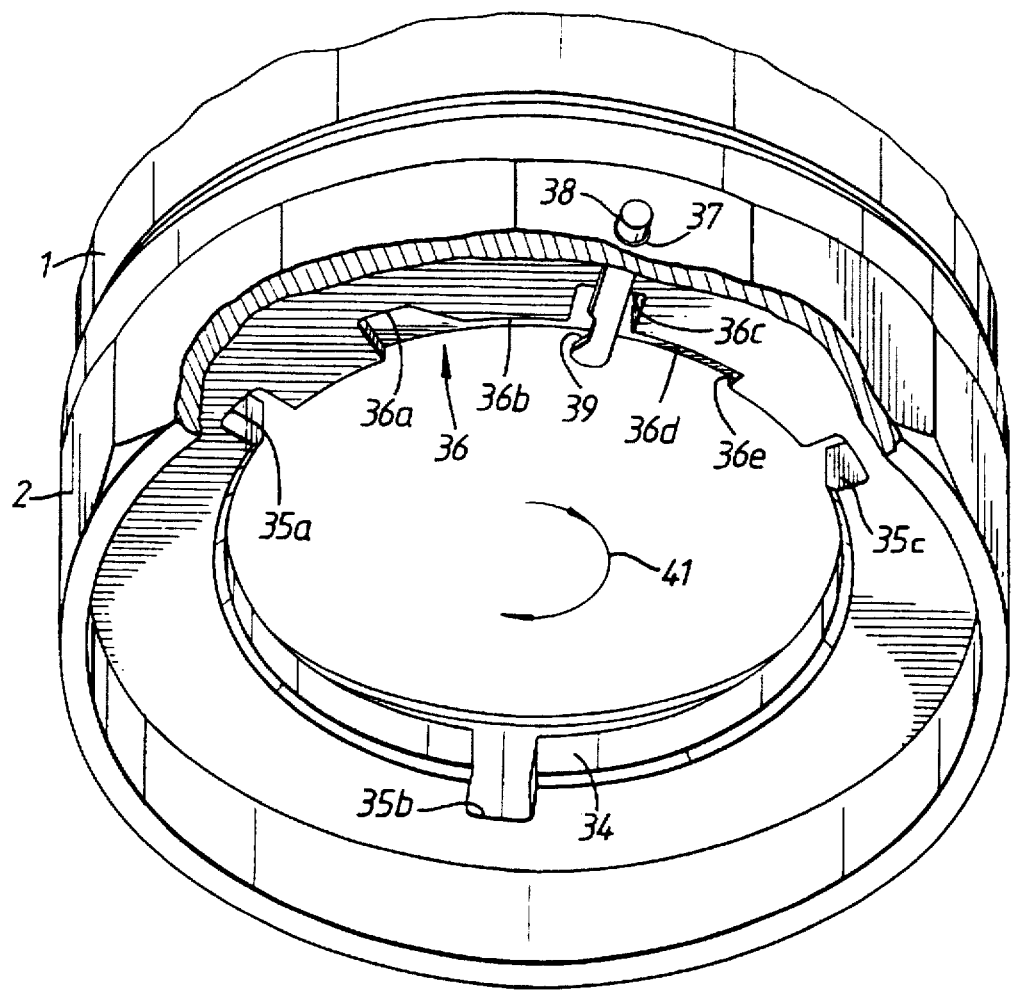
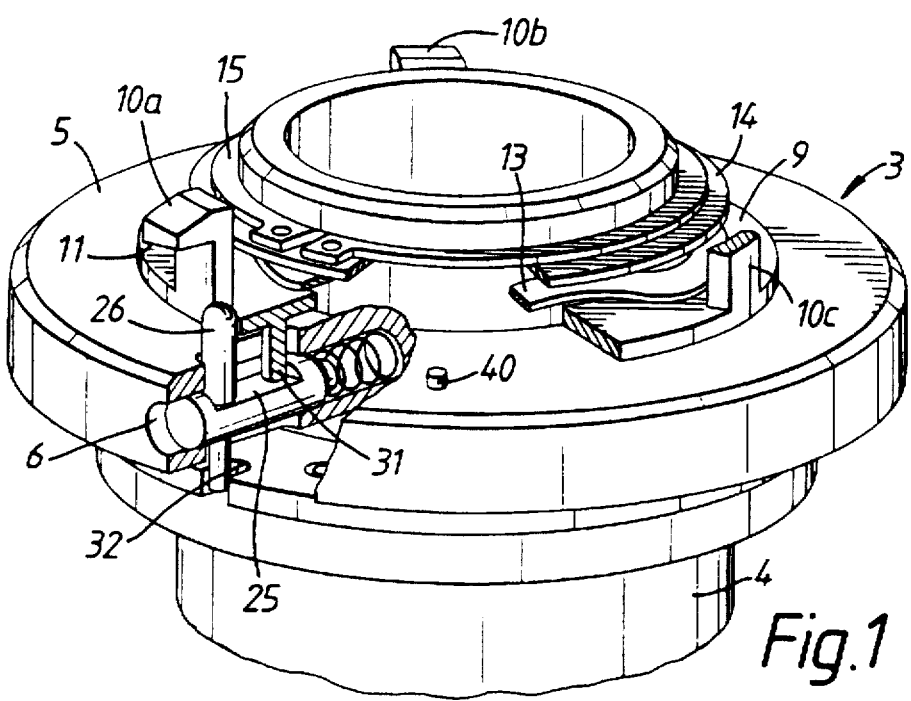
Fig.1

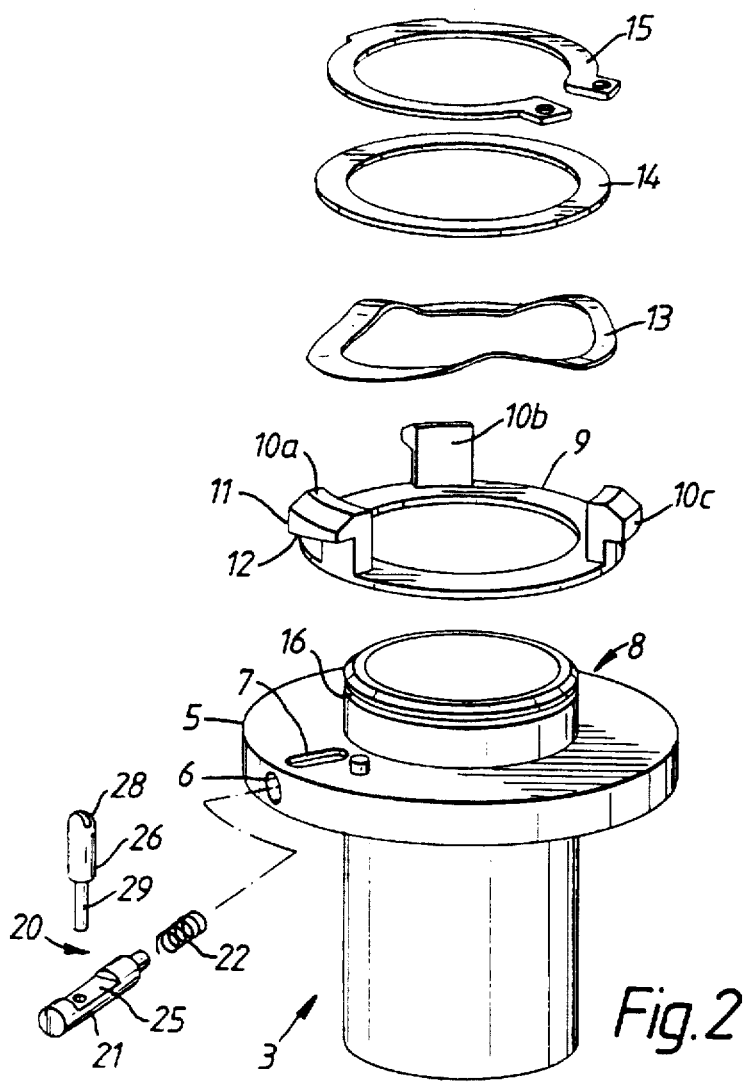
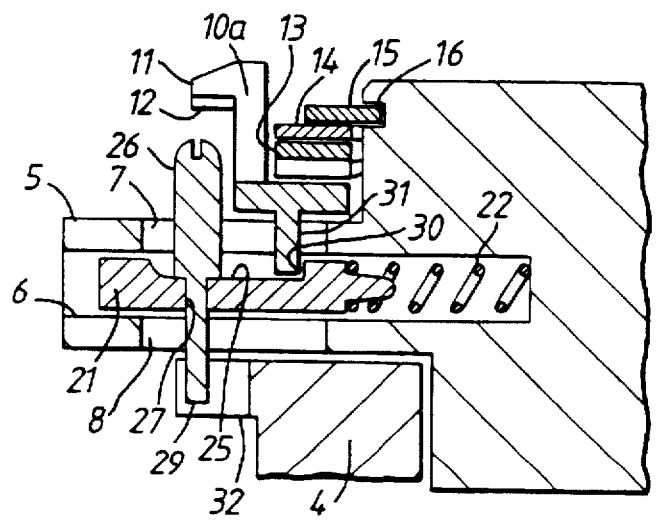

ROTARY DRUM SCANNER

FIELD OF THE INVENTION

This invention relates to a rotary drum scanner for use in a graphic reproduction process.

Modern methods of producing posters and other graphic works require that a film transparency is electronically scanned and the information contained therein stored in digital form. One type of scanner comprises a transparent drum upon which the transparency is mounted and which is then rotated at high speed. A reading head is then moved linearly with respect to the rotating drum to capture the information in the transparency. The drum is detachably mounted to a rotatable hub and this invention is particularly concerned with a safety mechanism for use in attaching the drum to the hub.

BRIEF SUMMARY OF THE INVENTION

This invention provides a rotary drum scanner comprising a rotatably mounted hub, a drum detachably mounted to the hub and an interlock mechanism which locks the hub to prevent rotation until the mechanism locks the drum to the hub.

Because of the interlock mechanism the hub cannot rotate unless the drum is locked to the hub. This therefore prevents the possibility of an operator accidentally switching on the motor, or other means, for rotating the hub before the drum is locked in position. Electrical interlock arrangements which inhibit the motor until a lid within the scanner casing has been closed have been proposed, but such arrangements are not always reliable.

Preferably attachment of the drum to the hub is operative to cause the interlock mechanism to lock the drum to the hub and to free the hub for rotation.

Preferably the interlock mechanism includes a radially movable bolt carried by the hub which in one condition engages a fixed part of the scanner to prevent rotation of the hub and in another condition engages a part of the drum.

BRIEF DESCRIPTION OF THE DRAWINGS

In order that the invention may be well understood an embodiment thereof will now be described by way of example with reference to the accompanying diagrammatic drawings, in which;

FIG. 1 is a partially cutaway perspective exploded view of part of a scanner according to the invention;

FIG. 2 is an exploded perspective view of the rotatable hub of the scanner shown in FIG. 1;

FIG. 3 is a cross section through the interlock mechanism shown in FIGS. 1 and 2 with the drum detached;

DETAILED DESCRIPTION OF THE PREFERRED EMBODIMENT

Figure 4:
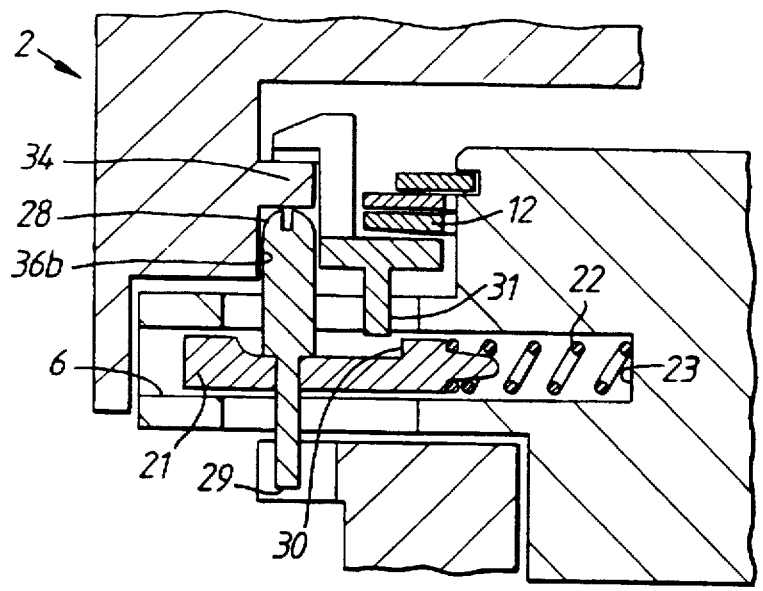
FIG. 4 is the same as FIG. 3, but with the drum at a preliminary stage of attachment.

As shown in FIG. 1 a rotary drum scanner includes a cylindrical transparent drum 1 attached at its base to a mounting ring 2 by which the drum is detachably mounted, by means of a bayonet type coupling, to a hub 3. The hub 3 is rotatably mounted within a fixed sleeve and bearing assembly 4.

As best seen in FIG. 2 the hub 3 is of generally cylindrical shape having an outwardly extensive flange 5 spaced a short distance from one end. A radially extensive bore 6 is formed within the flange 5. Through slots 7, 8 within each face of the flange communicate with the bore 6. The end portion 3a of the hub 3 beyond the flange 5 carries an annular ring 9 which includes three circumferentially equispaced generally L shaped lugs 10a, b, c. The head 11 of each lug includes an underlying face 12 which is tapered with respect to the opposing face of the flange 5. The ring 9 is resiliently biased against the flange 5 by means of a wavy spring washer 13, a flat washer 14 and a circlip 15 retained within a groove 16 formed in the end portion 3a.

A bolt 20 comprises an elongate plunger 21 located within the bore 6 which is biassed outwardly by means of a compression spring 22. The spring 22 rests against the blind end 23 of the bore (best seen in FIGS. 3 to 5). The plunger 21 includes an indented flat land or recess 25 and a pin 26 which is located in a through hole 27 within the land 25. The pin 26 includes a head 28 which protrudes through the upper most slot 7 and a tip 29 which protrudes through the lower most slot 8.

In the absence of the drum ring 2, and as best seen in FIGS. 1 and 3, the compression spring 22 urges the radially inner most shoulder 30 between the land 25 and the plunger 21 against a lug 31 which projects downwardly through the slot 7 from the underside of the ring 9. The lug 31 is itself urged into engagement due to the resilience of the spring washer 13 and in this way the pin tip 29 is retained within a radially extensive U shaped slot 32 (FIG. 1) provided in the upper most surface of the fixed sleeve 4 underlying the flange 5. The hub 3 is thereby locked to the fixed sleeve 4.

The drum ring 2 includes an internal inwardly extensive flange 34 which is provided with three circumferentially equispaced cut-outs or recesses 35a, b, c corresponding to the three lugs 10a, b, c respectively. A further arcuate cut-out 36 in the flange 34 includes a first region 36a within which the head 26 of the pin is designed to be located when the ring 2 and hub 3 are initially brought together. From there, the edge of the flange slopes radially inwardly to define a wedging surface 36b. A further recess 36c, deeper in a radial direction than 36a, is provided beyond the wedging surface 36b. A further recess 36d is provided beyond recess 36c and includes a radially extensive side wall 36e, the reason for which will be mentioned later on. The drum ring 2 further includes a through hole 37 communicating with the interior of the deep recess 36c. A radially movable button 38 is retained within the hole 37 and includes a recess 39 in one side to engage the pin head 26. A lug 40 is provided in the uppermost surface of the flange 5 to co-operate with recess 36d.

Figure 5:
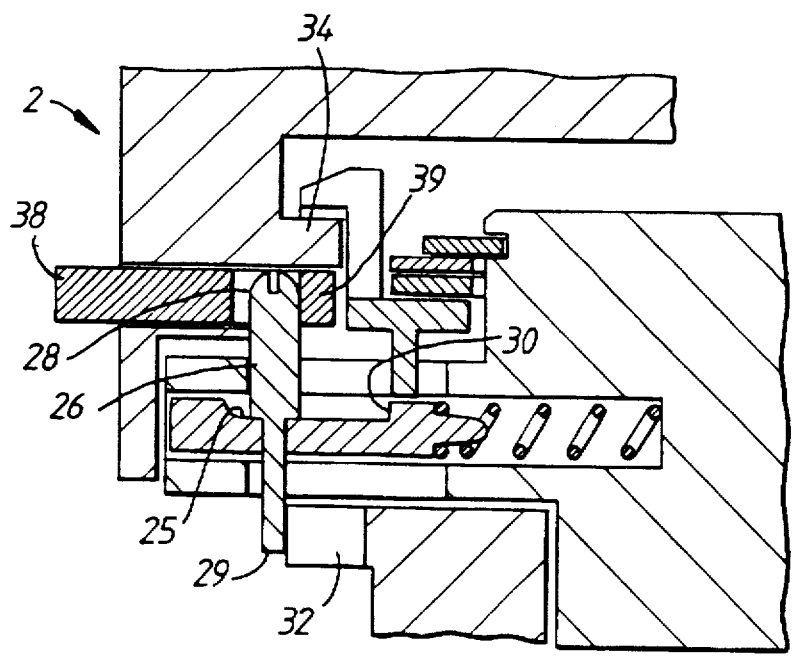
FIG. 5 is the same as FIG. 4, but with the drum at a final stage of attachment.

In use, in the absence of the drum, the hub 3 is in the locked condition described above with reference to FIG. 3. The drum is placed upon the hub with the lugs 10a, b, c engaged within their respective recesses 35a, b, c. Whilst the hub is held in the locked condition the drum is rotated in the direction of arrow 41 such that the wedge shaped surface 12 of each lug 10 engages the flange 34 pulling the ring 9 upwardly against the bias of the ring washer 13 and lifting the lug 31 clear of the plunger 21. At the same time, the wedging surface 36b urges the pin head 28 radially inwardly against the bias of the spring 22. Accordingly, as shown in FIG. 4, the hub remains locked in position. Continued rotation causes the pin head 28 to enter the cutout 39 in the button 38 whereupon the plunger 21 is urged outwardly so that the pin tip 29 clears the U-shaped slot 32. At the same time the lug 40 provided in the upper most surface of the flange moves along the recess 36d and contacts the wall 36e. During this drum locking procedure, the reaction force tends to force the pin head 28 against the underside of the flange 34. The resulting frictional forces means that the bolt 20 is not released into the recess 36c until the user releases the drum. The drum 1 is now locked to the hub 3, which is free to rotate.

If the bolt 20 were only held in place by the lug 31 on the ring 9, high surface stresses would be experienced on the plunger edge 30 just prior to release. In addition, the top of the plunger would tend to scrape the base of the lug 31 resulting in a slower less positive change from hub lock to rotating drum lock mode.

In order to remove the drum, the button 38 is depressed and the drum rotated slightly until the pin tip 29 aligns with the U-shaped slot 32. Further pressure on the button 38 then moves the bolt 20 radially inwards. Rotation in the opposite direction to that of arrow 41 lowers the ring 9 and lug 31 into engagement with the shoulder 30 so that the bolt 20 is retained within the bore 6. Continued rotation causes the pin head 28 to enter the recess 36a and for the lugs 10a, b, c to be located in their respective cutouts 35a, b, c. The drum is then free to be removed.

We claim:

1. A rotary drum scanner comprising a hub rotatably mounted to a fixed assembly a drum detachably mounted to the hub and an interlock mechanism which locks the hub against rotation relative to said fixed assembly until the mechanism locks the drum to the hub thereby preventing the hub from rotating unless the drum is locked to the hub.

2. A rotary drum scanner, according to claim 1, in which attachment of the drum to the hub is operative to cause the interlock mechanism to lock the drum to the hub and to free the hub for rotation.

3. A rotary drum scanner, according to claim 1, in which complementary bayonet coupling parts are provided on the drum and on the hub respectively.

4. A rotary drum scanner, according to claim 1, in which the interlock mechanism includes a radially movable bolt which is carried by the hub and which in one position engages a fixed part of the scanner to prevent rotation of the hub and in another position engages a part of the drum to free the hub for rotation.

5. A rotary drum scanner, according to claim 4, in which the hub carries an axially movable ring which includes bayonet coupling parts and a part which engages the bolt in the absence of the drum to lock the hub to the fixed part of the scanner.

6. A rotary drum scanner, according to claim 4, in which the bolt includes a radially extensive portion and surfaces disposed above and below the radially extensive portion which engage the fixed part of the scanner and the drum respectively.

7. A rotary drum scanner, according to claim 6, in which the hub includes a flange and is mounted for rotation within a fixed sleeve including a planar surface parallel to and adjacent the flange, the bolt being operative to engage a formation within the planar surface to lock the hub against rotation.

8. A rotary drum scanner, according to claim 5, in which the drum includes an internal inwardly extending flange which includes cutouts to receive upstanding lugs formed on the axially movable ring, and a further cutout which engages the bolt and allows the bolt to move out of engagement with the fixed part of the scanner as the drum is mounted by rotating it with respect to the hub.

9. A rotary drum scanner, according to claim 8, in which the bolt is resiliently biassed outwardly into engagement with the part on the axially movable ring, partial attachment of the drum to the hub being operative to move the ring out of engagement with the bolt and into engagement with the further cutout on the drum flange.

10. A rotary drum scanner, according to claim 9, in which the further cutout includes a surface which holds the bolt in engagement with the fixed part of the scanner after the axially movable ring has been moved out of engagement with the bolt, before allowing the bolt to move out of engagement with the fixed part of the scanner and into locked engagement with the drum.

11. A rotary drum scanner according to claim 10 in which the drum carries a radially movable button engageable with the bolt.

* * * * *